Aug. 30, 1960
J. J. HUCK
2,950,600
LIQUID PRESSURE CONTROL SYSTEMS
Filed Dec. 28, 1951
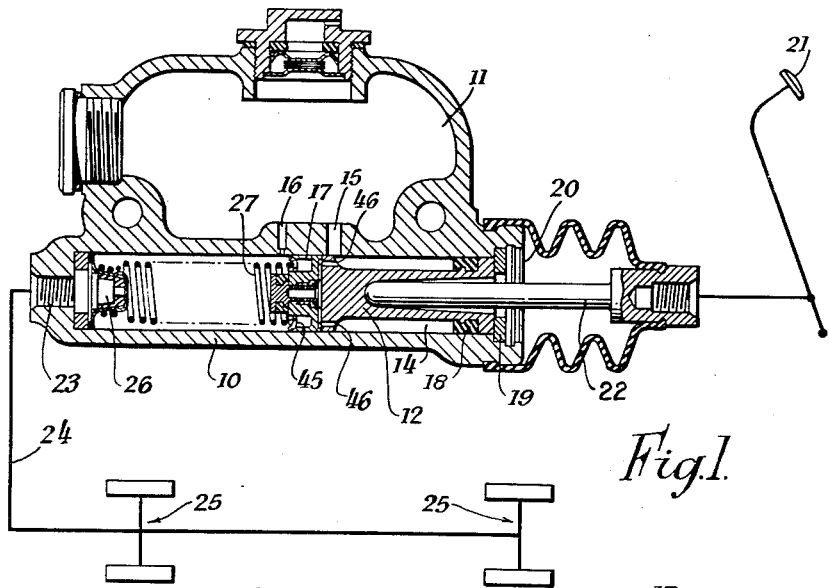
Fig.1.
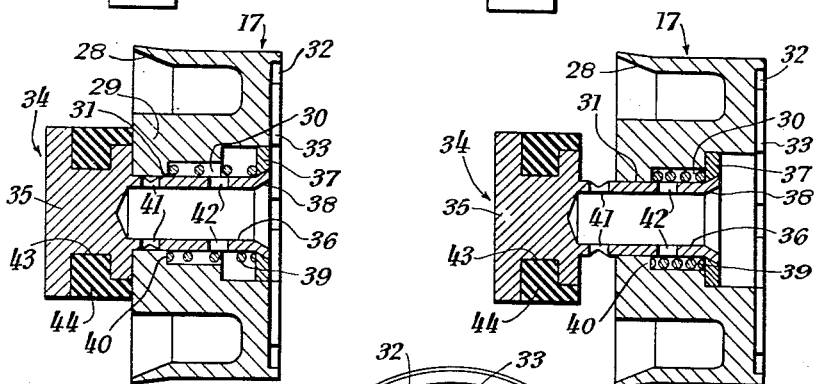
Fig.2.
Fig.3.
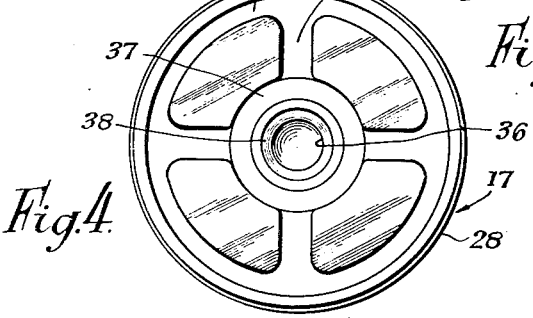
Fig.4.
INVENTOR
John James Huck
BY
Stevens, Davis, Miller + Mosher
his ATTORNEYS

United States Patent Office 2,950,600
Patented Aug. 30, 1960

2,950,600
LIQUID PRESSURE CONTROL SYSTEMS

John James Huck, Leamington Spa, England, assignor to Automotive Products Company Limited, Leamington Spa, England Filed Dec. 28, 1951, Ser. No. 263,935

Claims priority, application Great Britain Jan. 8, 1951

2 Claims. (Cl. 60—54.6)

This invention relates to liquid pressure control systems and more particularly to pressure generators for such systems, such as master cylinders and pumps. The invention is particularly useful in connection with master cylinders used to operate brakes, a clutch or some other controlled device, the master cylinder, when it is not in operation, being connected to a liquid reservoir by way of a breathing port in the master cylinder which, when the master cylinder piston is displaced to produce pressure, is covered by the said piston.

In liquid pressure master cylinders of the kind having a breathing port it is essential that there shall be provision for flow of liquid from the reservoir into the master cylinder during the return stroke of the piston, since the piston tends to return at such a rate that, owing to the restriction of flow in the pipes of the system, liquid does not return to the master cylinder quickly enough to keep it full, so that, unless liquid can enter from the reservoir, a vacuum is formed, and air may be drawn into the system. For many years it has been common practice to provide an annular space around the master cylinder position, and to make the piston packing as a cup of relatively soft resilient material, which would collapse and allow liquid to flow past it into the master cylinder. That arrangement has the disadvantage that the packing cup tends to be damaged as it passes over the breathing port, and it has been proposed to provide a cup or other packing of harder material, and to provide a separate non-return valve through which liquid could enter the cylinder from the reservoir.

Similar arrangements have been used in pumps for producing the liquid pressure in liquid pressure control systems, and whilst such pumps are not usually provided with a breathing port which may damage a soft cup packing, a harder packing is advantageous from the point of view of its wearing properties.

According to the present invention, a packing for a piston of a pressure generator of a liquid pressure control system comprises a cup-like member of relatively hard resilient material, the cup-like member being formed with a central boss in which is a through passage controlled by a non-return valve supported wholly by the said cup-like member.

The term "relatively hard resilient material" is intended to include such materials as that sold under the name of "nylon," or a hard rubber compound which provides, at the thin lip of the packing, sufficient flexibility and resilience to ensure a satisfactory seal, but is not flexible enough to be readily forced, under pressure, into the small breathing port in the master cylinder, and which provides a central boss which may be regarded as substantially rigid.

The invention will now be described with reference to the accompanying drawings, in which:

Figure 1 is a diagram of a liquid pressure braking system, the master cylinder, which is shown in sectional elevation, including one form of packing according to the invention;

Figure 2 is a sectional elevation of the packing shown in Figure 1, on an enlarged scale, the valve therein being shown in the closed position;

Figure 3 is a sectional elevation similar to Figure 2, but showing the valve in the open position;

Figure 4 is a rear elevation of the packing shown in Figures 2 and 3.

Referring to the drawings, Figure 1 shows a master cylinder 10 of known type the body of which is cast in one with a liquid reservoir 11. A piston 12 slidable in the master cylinder is formed with a reduced portion to provide an annular chamber 14 connected by a port 15 to the reservoir 11, and a second port 16, of smaller diameter, also connects the master cylinder to the reservoir, this port being so positioned that when the piston is fully retracted, as shown in Figure 1, it opens into the cylinder just in front of the main piston packing 17. The port 16 is commonly termed a breathing port. A second packing ring 18 is provided at the rear end of the piston, and a washer 19, held in place by a spring ring 20, acts as a stop for the piston. The piston 12 is operated by a pedal 21 through a push rod 22.

The outlet 23 from the master cylinder is connected by a conduit 24 to motor cylinders associated with the brake assemblies, the motor cylinders being shown diagrammatically at 25. A valve 26 of known type is provided at the outlet 23 to maintain a predetermined minimum pressure in the conduit 24 and cylinders 25, a spring 27 being provided in the master cylinder which not only acts as a return spring for the piston 12 and a closing spring for the valve 26, but also holds the packing 17 against the front face of the piston.

Referring to Figures 2, 3 and 4, the piston packing 17, is a cup packing having the edge of its lip 28 tapered internally, and having a central boss 29 projecting within the lip. A circular hole 30 extends axially through the boss, the hole having three portions of different diameters with flat shoulders at the changes of diameter, the smallest diameter portion 31 being at the front of the boss and the largest at the back. The rear face of the packing 17 is formed near its edge with an annular groove 32, and with radial grooves 33 leading from the groove 32 into the hole 30.

A valve member 34 comprising a head 35 and a tubular stem 36 is mounted with the stem extending into the hole 30, and the head 35 at the front of the cup packing. A washer 37 fitting slidably in the largest portion of the hole 30 is retained on the stem 36 by expanding the end of the latter as shown at 38, and a spring 39 is fitted between the washer 37 and the shoulder 40 at the inner end of the smallest portion 31 of the hole 30. The stem 36 fits slidably in the smallest portion 31 of the hole 30, and is formed with pairs of radial ports 41 and 42, the former, as shown in Figure 3 being positioned beyond the front face of the boss 29 when the valve member 34 is displaced forwardly. The head 35 of the valve member is formed with a circumferential groove 43, the wall of the said groove nearest to the packing being of smaller diameter than the other wall, and a ring 44 of relatively soft resilient material such as soft rubber, of L shape has one limb located in the groove 43, the other limb extending over the smaller-diameter wall of the groove and being pressed against the front end face of the boss 29 when the valve is closed.

The lip of the packing 17 is urged outwardly against the cylinder wall by a dished metal ring 45 (Figure 1) against which the piston return spring 27 abuts.

The head end of the piston 12 is formed with holes 46 which connect the annular chamber 14 with the annular groove 32 on the rear face of the packing cup 17.

During the forward stroke of the piston 12, the lip of the packing cup 17 covers the breathing port 16 during its initial movement, and, as the piston 12 continues to move forward it creates pressure in the cylinder, this pressure tending to keep the valve member 34 in the centre of the packing cup 17 closed. During the return stroke the pressure in the cylinder falls, and, as the breathing port 16 is closed until the end of the stroke, the valve member 34 opens to admit liquid to the cylinder by way of the holes 46 in the piston head, the annular and radial groove 32 and 33 in the rear face of the packing cup, the hole 30 through the boss of the packing cup, and the ports 41 in the stem 36. When the piston 12 is fully retracted, liquid can flow freely into and out of the cylinder by way of the breathing port 16 to ensure that the master cylinder remains full and the liquid therein remains at a pressure depending only on the head of liquid in the reservoir.

The invention provides a convenient packing member for a master cylinder which, like the well known collapsing rubber cup packing, is self-contained and can be removed and replaced as a unit.

Whilst the above description relates to a liquid pressure braking system, it will be understood that the invention may be applied to other liquid pressure control systems of the kind set forth in the opening paragraph of this specification.

It will be obvious that a packing member as described above may be used in a liquid pressure pump, the non-return valve in the packing member of each piston then constituting the suction valve for the pump cylinder in which that piston operates.

I claim:

1. In a master cylinder, a cylinder bore, a piston having a forward face and slidably received in said cylinder bore, an annular chamber located rearwardly of said forward face of said piston, a fluid reservoir, a port communicating said fluid reservoir and annular chamber, at least one passage formed in said piston for exhausting fluid from said annular chamber during retractile movement of said piston, a packing of relatively hard resilient material seated on the forward face of said piston, at least one recess formed in the surface of said packing adjacent the forward face of said piston to allow liquid to flow therebetween, a through passage in said packing, and a one-way valve controlling fluid flow in the rcess between said packing and piston and across said through passage during retractile movement of said piston.

2. In a master cylinder for a liquid pressure control system, a piston slidably received in said master cylinder, a packing carried at the head of said piston, an annular chamber formed rearwardly of the head of said piston, a hydraulic reservoir in said master cylinder, a port connecting said reservoir and annular variable volume chamber, a passage formed in the face of said piston and between said piston and said packing for exhausting fluid from said annular variable volume chamber during retractile movement of said piston, a packing located at the head of said piston, said packing being constructed to permit fluid passage in a radially inward direction between said packing and piston face, so that liquid is transferred across said piston during the retractile stroke thereof, said packing being formed with a central boss in which is located a through passage, and a non-return valve for controlling fluid movement across said piston and through the passage in said packing during retractile movement of said piston, said non-return valve being supported wholly by said packing member.

References Cited in the file of this patent

UNITED STATES PATENTS

| | | |
|---|---|---|
| 717,365 | Ehrhardt | Dec. 30, 1902 |
| 977,736 | Hanson | Dec. 6, 1910 |
| 982,677 | Householder | Jan. 24, 1911 |
| 2,002,672 | Melott | May 28, 1935 |
| 2,060,846 | Bowen | Nov. 17, 1936 |
| 2,136,835 | Begg | Nov. 15, 1938 |
| 2,181,900 | Langdon | Dec. 5, 1939 |
| 2,206,356 | Hutchings | July 2, 1940 |
| 2,466,127 | Smith | Apr. 5, 1949 |
| 2,505,376 | Asselin | Apr. 25, 1950 |
| 2,531,532 | Rossman | Nov. 28, 1950 |
| 2,702,046 | Zimmer | Feb. 15, 1955 |

FOREIGN PATENTS

| | | |
|---|---|---|
| 317,092 | Italy | Apr. 24, 1934 |
| 564,608 | Great Britain | Oct. 5, 1944 |